United States Patent [19]
Collins

[11] Patent Number: 5,143,392
[45] Date of Patent: Sep. 1, 1992

[54] RETRACTABLE HOSE SYSTEM
[75] Inventor: David M. Collins, Chicago, Ill.
[73] Assignee: Donna L. Jones, Wonder Lake, Ill.; a part interest
[21] Appl. No.: 685,738
[22] Filed: Apr. 16, 1991
[51] Int. Cl.⁵ ............................................. B60D 1/62
[52] U.S. Cl. .................... 280/420; 280/421; 280/422
[58] Field of Search ................... 280/420–422, 280/456.1; 180/14.5; 191/11, 12.2 R; 213/1.3, 76

[56]     References Cited
U.S. PATENT DOCUMENTS

| | | | |
|---|---|---|---|
| 2,391,141 | 12/1945 | Dour et al. | 191/12.2 R |
| 2,856,016 | 10/1958 | Lindeman | 280/422 X |
| 3,888,513 | 6/1975 | Pilz et al. | 280/421 |
| 4,008,791 | 2/1977 | Shafii-Kahany et al. | 191/12.2 R |
| 4,076,272 | 2/1978 | Penton | 280/421 |
| 4,092,034 | 5/1978 | Becker | 280/420 |
| 4,489,223 | 12/1984 | Puckett et al. | 191/12.2 R |

FOREIGN PATENT DOCUMENTS 53-136683  11/1978  Japan .................... 280/422

Primary Examiner—David H. Bollinger
Attorney, Agent, or Firm—Mathew R. P. Perrone, Jr.

[57]     ABSTRACT

A heated box assembly including a case and a case support is mounted on a tractor chassis behind the cab. Within that case are electrical cable connections, heating elements, insulation, an electrical cable connection for a trailer mounted on a reel, and two air hoses mounted on reels for connection to the air brake system of a trailer. An alcohol injector used in combination with heating of the box avoids freezing of the hose. The heated box keeps the hose from freezing while the hose is in the box. When the air brakes are applied, the alcohol is injected into the hose and keeps the hose from freezing while in use.

19 Claims, 4 Drawing Sheets

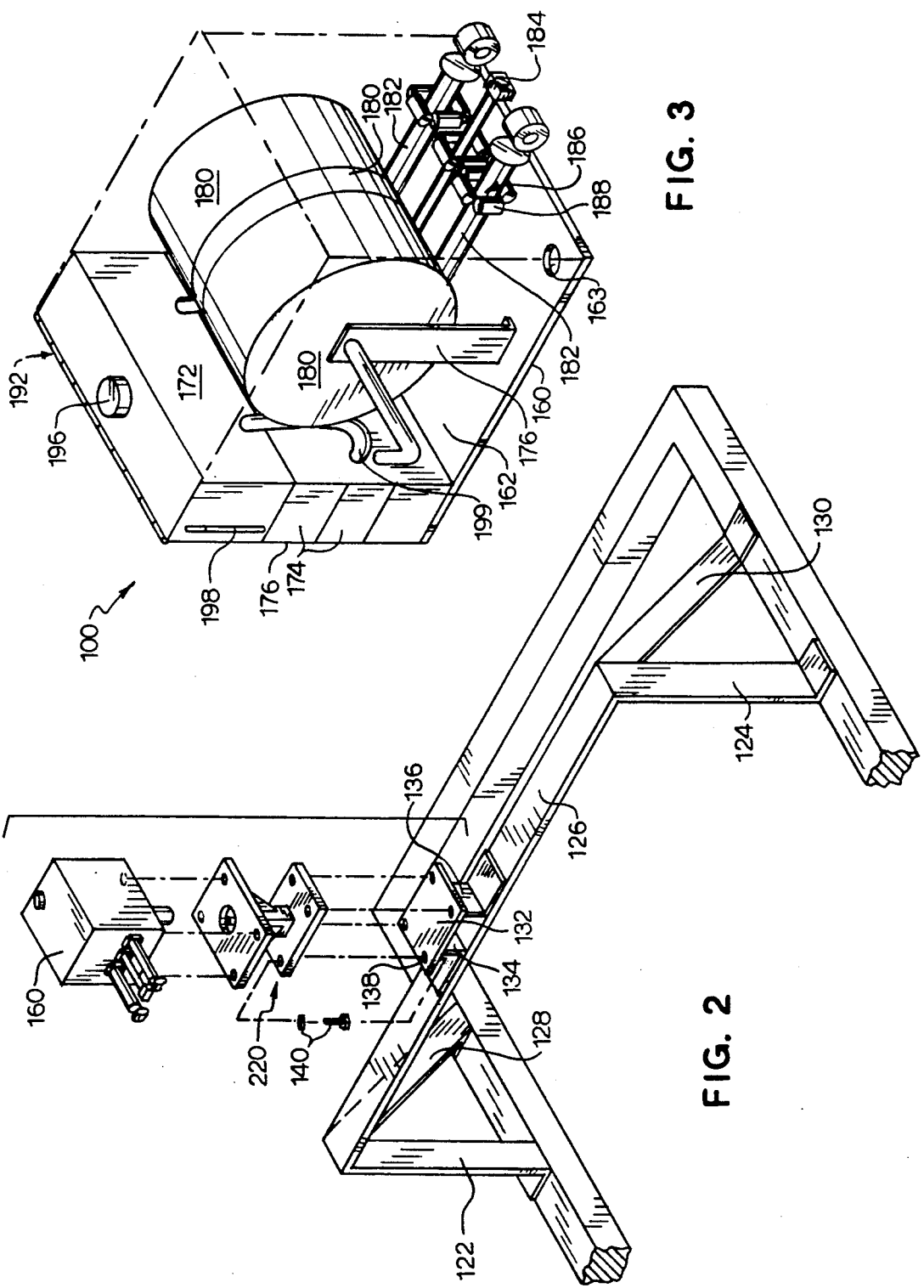

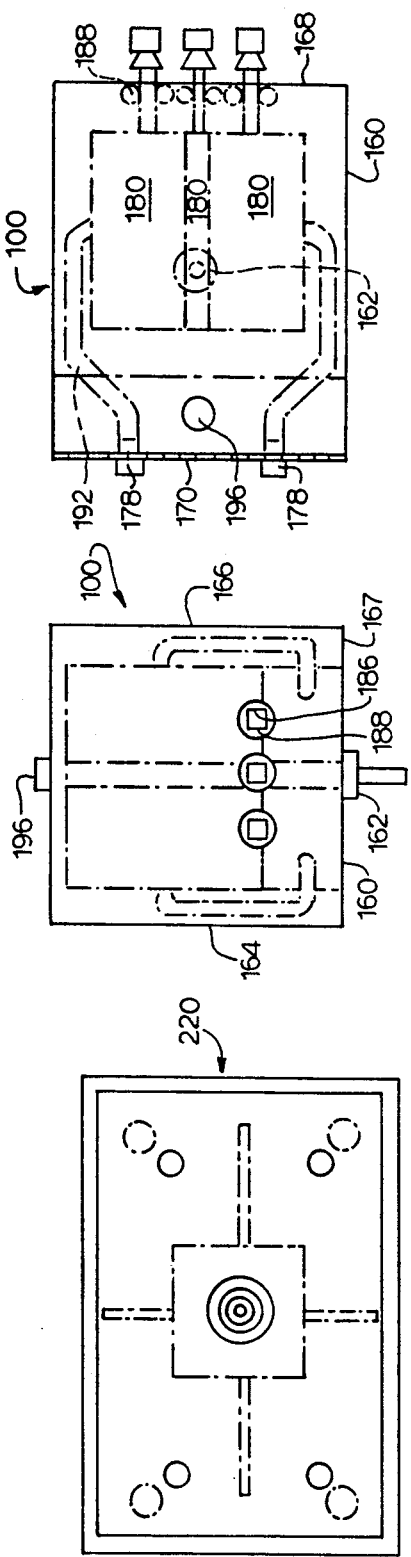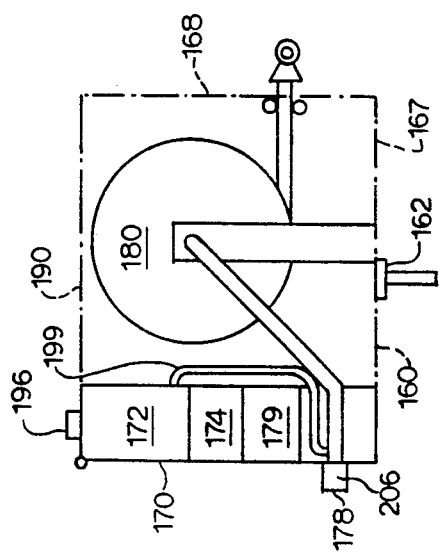

RETRACTABLE HOSE SYSTEM

This application relates to an apparatus and a method for storing a truck air hose and a cable, and more particularly to an apparatus and a method for storing a truck hose and an electric cable, and keeping the truck air hose free of freezing material.

BACKGROUND OF THE INVENTION

In a typical situation, a tractor of a heavy truck rig provides braking power and electric power to the trailer. The tractor has a pneumatic power braking system connected to a braking system of the trailer. This pneumatic system has one or more fluid pressure outlets with hoses connected thereto. These hoses transmit the effects of the fluid pressure of the braking system of the tractor to the braking system of the trailer so both systems function simultaneously. Power for the lighting system on the trailer also is provided by an electric cable from the tractor.

Basically, three types of heavy tractors used in the United States are the cabover, the slip cab and the conventional cab. The slip cab includes a flat nose cab wherein the entire driver cabin rotates forwardly in order to allow access to the engine. The cabover is a slip cab with a sleeper. The conventional tractor has a hood somewhat like an automobile and may also have a sleeper. Each of these tractors has air hoses for coupling the tractor braking system to the trailer braking system, and an electric cable to provide power for the trailer lighting system.

Due to the flexibility between the tractor and the trailer pulled by the tractor, it is necessary for the tractor to carry a reasonable amount of excess hose and cable, in order to compensate therefor. This excess hose and cable cause problems both when in use with a trailer and when not in use. When the tractor is without a trailer (commonly known as bobtail) the hoses and cable hang loosely in racks on the truck or are otherwise displayed. With such a display, the hoses rub together unnecessarily, and the resulting friction causes damage to the hoses.

This wear on the hoses makes them extremely dangerous. The hoses have to be changed regularly as a safety precaution. Such changes are an expensive and a time consuming undertaking. However, if the hoses fail, the trailer brake system fails. If the trailer brake system fails the brakes lock up and the truck can be involved in an accident which could be extremely costly in terms of material damage and injuries. The hoses can also be damaged and weakened by stress, such as can be caused by sharply turning.

Additionally, the dangling hoses and cable are unsightly. With the hoses and cables entangled as is encouraged by the free hanging nature thereof, a problem is created for the driver who must first untangle and separate the hoses and cables before they can be used. The hoses also thump against the cab which can cause an annoyance to the driver. The crimping of the hoses and cable can also contribute to weakening and premature failure of the hoses.

Additionally, it is common for brake lines to acquire moisture therein and freeze—especially during the winter. In fact, the brake lines can even freeze while in use. This freezing problem is magnified with rail piggyback trailers, or a plurality of trailers in a lot, which are moved constantly. A sitting trailer freezes the hoses more easily than does a moving trailer. So anyone in a drop and switch operation can run into problems with a frozen hose. It is desirable to avoid this freezing aspect and the resultant damage therefrom. If this damage can be avoided, great advantages can be obtained.

SUMMARY OF THE INVENTION

Accordingly among the many objects of the present invention is to provide an improved mechanism for protecting a hose on a heavy duty truck from wear and freezing.

It is a further object of this invention to provide an improved mechanism for protecting a hose on a heavy duty truck by avoiding freezing of the hose.

A still further object of this invention is to provide an improved mechanism for protecting a hose on a heavy duty truck while keeping the hose warm.

Yet a further object of this invention is to provide an improved mechanism for protecting a hose on a heavy duty truck by storing the hose.

Also an object of this invention is to provide an improved mechanism for protecting a hose on a heavy duty truck by eliminating hanging of the hose.

Another object of this invention is to provide an improved mechanism for protecting an electric cable on a heavy duty truck.

Yet another object of this invention is to provide an improved method for protecting a hose on a heavy duty truck.

Still another object of this invention is to provide an improved method for protecting a electric cable on a heavy duty truck.

It is a further object of this invention to provide an improved mechanism for protecting a hose on a heavy duty truck during rail piggyback travel.

A still further object of this invention is to provide an improved mechanism for protecting a hose on a heavy duty truck during storage of the trailer.

These and other objects of the invention (which other objects become completely clear by consideration of the specification, claims and drawings as a whole) are met by providing a box containing at least one reel for the hose or cable on a heavy duty truck. An alcohol injector used in combination with heating of the box avoids freezing of the hose. The heated box keeps the hose from freezing while the hose is in the box. The alcohol injector is activated by air from the tractor's compressor. With air brakes, when the brakes are applied the alcohol is injected into the hose and keeps the hose from freezing while in use.

BRIEF DESCRIPTION OF THE DRAWINGS

FIG. 2 depicts an exploded, perspective view of box support 120 mounted on tractor 102.

FIG. 3 depicts a perspective, partial cutaway view of box assembly 100.

FIG. 4 depicts a front, cutaway, view of box assembly 100.

FIG. 5 depicts a top, cutaway view of box assembly 100.

FIG. 6 depicts a side, cutaway view of box assembly 100.

FIG. 7 depicts a side, cross-sectional view of pivotal mounting assembly 220.

FIG. 8 depicts a top view of pivotal mounting assembly 220.

Throughout the Figures of drawings, where the same structure appears in more than one Figure of the drawing, the same reference number is applied thereto.

DESCRIPTION OF THE PREFERRED EMBODIMENTS

A heated box assembly including a case and a case support is mounted on a tractor chassis behind the cab. Within that case are electrical cable connections, heating elements, insulation, an electrical cable connection for a trailer mounted on a reel, and two air hoses mounted on reels for connection to the air brake system of a trailer. Each air hose is mounted on its own reel.

When not in use, each air hose and the electrical cable connection are stored within the case on their respective reels. The case also includes at least one heating element, in order to heat the interior of the box and prevent freezing of the air hoses stored in the case, which is a problem in the cold months. Also, connected to the air hoses is an alcohol or antifreeze vaporizer for the purpose of injecting antifreeze or alcohol into the air hoses to prevent freezing of the same.

The heated box assembly can also help a trailer used in a piggyback operation, a drop and switch operation, or trailer storage facility. By piggyback is meant train transporting of a plurality of trailers. The residual antifreeze in the hose and other aspects of this box assembly make the hoses of the stored trailers, and hence the trailer, for a driver and tractor to pickup.

In this fashion, a substantial safety advantage is achieved. The box assembly is suitable for use because it is compact. Preferably, the case is about 60 centimeters (two feet) in length and width by about 35 centimeters (14 inches) in depth.

Figure 1:
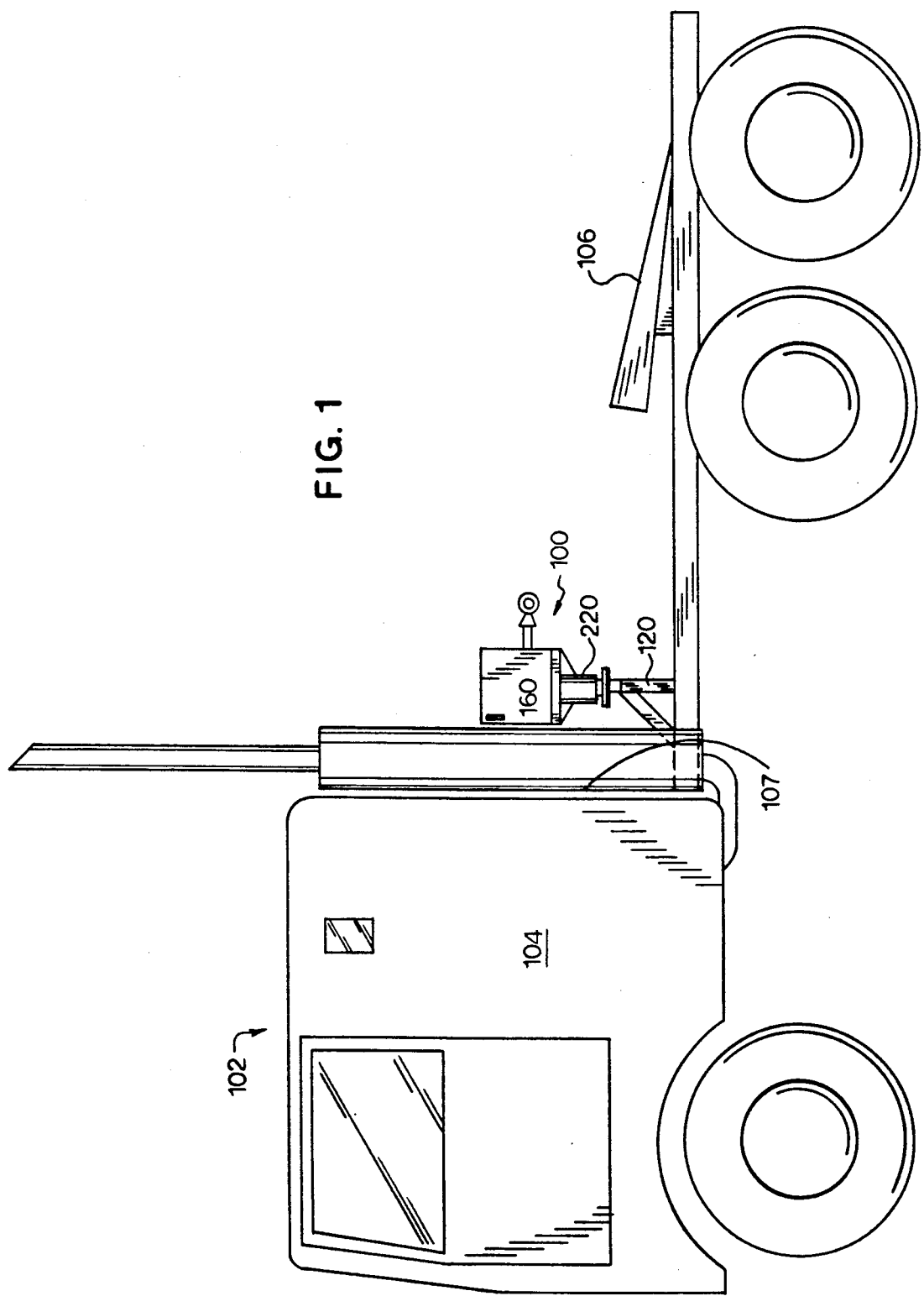
FIG. 1 depicts a side view of box assembly 100 mounted on tractor 102.

Referring now to FIG. 1, a side view of hose box assembly 100 is shown as mounted on tractor 102. Hose box assembly 100 includes case support 120 (FIG. 2), case 160 and pivotal mounting assembly 220 interconnected to provide a storage facility for at least one air hose and/or electrical cable. Cab 104 of tractor 102 is depicted to show the relative location of the hose box assembly 100. Logically the hose box assembly 100 is spaced from the fifth wheel 106 and positioned adjacent rear wall 107 of cab 104 to prohibit interference of the box assembly 100 with the trailer (not shown). Tractor 102 is depicted as a cabover.

Referring now to FIG. 2, case support 120 provides support for pivotal mounting assembly 220. Case support 120 is preferably made of three inch (7.6 centimeter) C-channel steel available from Sprague Iron of Chicago, Ill. Equivalent material may also be substituted. To secure case support 120 to side frame rail 108 bolting is preferred, while welding or other suitable attachment mechanisms are operable. In some cases, where welding may not be permitted, other attachment mechanisms may be used. Combinations of attachment mechanisms may also be used. This box support 120 is arranged and configured to allow for flexibility in turning and backing of the tractor 102 with the trailer (not shown). In this fashion, stress on the hoses is avoided and wear is reduced.

Case support 120 includes a first side bar 122 and a second side bar 124. The first side bar 122 is connected to a first side frame rail 108 of the tractor 102. Second side bar 124 is connected to second side frame rail 108. Side bars 122 and 124 extend substantially perpendicular to side frame rails 108. Such connections are made by bolting, welding or in any other suitable manner.

Connected to and between a top portion of first side bar 122 and second side bar 124 is a top bar 126. Supporting first side bar 122 is first angle bar 128. First angle bar 128 is secured to the top portion of first side bar 122 at one end thereof and to first frame side rail 108 on an angular basis at the other end thereof. This provides for an arched, triangulated support for case support 120 between first side bar 122, first frame side rail 108 and first angle bar 128.

Second side bar 124 is supported in a similar fashion. Second angle bar 130 is secured at one end thereof to the top of second side bar 124 at or adjacent to the top of second side bar 124 and at the other end thereof to the second frame side rail 108. In a similar fashion second side bar 124, second angle bar 130 and second frame side rail 108 form a triangulated, arched support for case support 120 and more specifically top bar 126 thereof.

Centrally located on top bar 126 is support plate 132. The support plate 132 is supported above top bar 126 by first box arm 134 and second box arm 136. Second box arm 136 is closer to second side bar 124 than to first side bar 122. Likewise first box arm 134 is closer to first side bar 122 than to second side bar 124.

Support plate 132 includes four plate apertures 138. Each plate aperture 138 receives a nut and bolt assembly 140. The nut and bolt assemblies 140 secure pivotal mounting assembly 220 to frame rails 108 of tractor 102, and thus secure case 160 of the box assembly 100 to frame rails 108 in pivotable manner to be described hereinafter.

The structure of box assembly 100 becomes clear when considering FIG. 3, FIG. 4, FIG. 5, and FIG. 6 as a unit. Case 160 of box assembly 100 includes mounting base 162. In the mounting base 162 are a sufficient number of a mounting apertures 163 substantially aligned with a plurality of bolts 236 extending upwardly from a top surface, of pivot mounting assembly 220 to secure case 160 to pivotal mounting assembly 220.

Case 160 is substantially a hollow and rectangular, thus being generally box in shape and includes four substantially vertical sides. There is a first side 164 and a second side 166 secured substantially perpendicular to a bottom wall 167. A front wall 168 and a rear wall 170 are secured to the bottom surface 167 to complete the cubical case 160.

Adjacent the rear wall 170 is an alcohol container 172, a vaporizing device 174 (available from Unocal, Inc. of San Francisco, Calif.) for the alcohol or antifreeze, an electrical connection 176 adjacent the vaporizing device 174 and at least one air intake mechanism 178 to supply air to the brakes of a trailer. The air intake mechanism 178 is, of course, connected to the truck compressor (not shown). A heating element 179 in the case 160 of box assembly 100 is standardly connected to the tractor 102 electrical system to provide for heating of the interior of the case 160.

Adjacent the front wall 168 of the case 160 is a pair of reel mounts 176 which support a series of two or three spring loaded reels 180 standardly mounted in case 160. Mounted in a standard fashion on two of the three reels 180 are air hoses 182 for the air brakes of the trailer (not shown). Centrally mounted on the third reel 180 is electric cable 184. In this fashion, the air hoses 182 and electric cable 184 are stored for use within assembly 100 on the tractor 102.

Each reel 180 controls the amount of air hose 182 and/or electric cable 184 that issues out of the box assembly 100. A reel 180 pays out or takes up air hose 182 and electric cable 184 as required. There is a reel 180 each of air hose 182 and electric cable 184 in the preferred embodiment. A typically suitable version of reel 180 is available from Coxwell's, Incorporated of Los Angeles, Calif. The spring loaded feature of reels 180 permits the pay out of air hose 182 and electric cable 184 as required, and the uptake and storage of same, as required.

In the front wall 168 of case 160 are a plurality of hose apertures 186 through which, the air hoses 182 and/or electric cable 184 exit toward the rear of the tractor 102. Mounted around each aperture 186 are brushes 188 for the purpose of cleaning off and cushioning the air hoses 182 and/or electric cable 184 as they are retracted onto the reels 180 when not in use. In this fashion, the air hoses 182 and electric cable 184 are kept clean and abrasion is prevented, minimized or greatly reduced.

Case 160 is preferably constructed of diamond plate sheet metal. The metal is available from Sprague Iron of Chicago, Ill. The top 190 of box assembly 100 is mounted thereon by a piano hinge 192 spanning the entire width of the case 160 adjacent the alcohol container 172. Another securing device may also be used to replace piano hinge 192, but piano hinge 192 is preferred.

The alcohol container 172 is accessible through the top 190. The alcohol may be poured into the cap 196 of alcohol container 172 and accessed without raising the top 190. By alcohol or antifreeze is meant any composition capable of preventing the freezing of the air hoses 182.

The top 190, on the other hand, may be raised and access may be provided to the interior of the case 160 for maintenance of the reels 180 and other necessary work. In the side of the alcohol or antifreeze container 172 is a fluid level viewing mechanism 198 for determining how much antifreeze is in the container 172. In this fashion, the antifreeze level can be checked without disassembling the case 160.

Antifreeze container 172 is preferably a heavy duty plastic bottle. The plastic quality provides for durability and long term wear required in a heavy-duty truck. Vaporizer 174 is operably connected in a standard manner to container 172. The vaporizer 174 is also connected to each air hose 182 with a tube 199 for each air hose 182 to provide an injection of antifreeze vapor therein to prevent freezing thereof.

The electrical connector 176 provides not only for trailer light connections, but also provides power for the case heating elements 179. The main air supply connection 178 to case 160 is accomplished by a hose fitting 206 to provide for the proper connection.

Referring now to FIG. 7 and FIG. 8, pivotal mounting assembly 220 is secured to support plate 132 and thereby supports case 160. The pivotal mounting assembly 220 includes a bottom plate 222 having mounting apertures 224, which align with apertures 138 in support plate 132, which in turn receive nut and bolt assemblies 140 therethrough to secure bottom plate 222 to support plate 132. Of course, any suitable securing device may replace nut and bolt assemblies 140. Secured onto bottom plate 222 is a lower lubricated bearing 226 having a central spindle 228 mounted therein.

The central spindle 228 is enclosed by outer spindle housing 230. Four sections of radially disposed support web 232 are secured to outer spindle housing 230 and support a top plate 234 of the mounting assembly 220. Top plate 234 includes a plurality of mounting bolts 236 for receipt of case mounting base 162 thereof, which may be secured thereover by case nuts 161. In this fashion, the case 160 may be securely fastened to the frame 108 of tractor 102.

Spindle bolt 238 is centrally mounted in central spindle 228. Central spindle 228 is secured onto spindle bolt 238 by cotter key 240 and lock nut 242. A support washer 244 secured between central spindle 228 and lock nut 242 allows for a rotational movement of the central spindle 228 and and the outer spindle housing 230. Below the cotter key 242 is an upper bearing 246 further supporting the central spindle 228. In this fashion, the case 160 (shown in FIG. 5) mounted thereon can rotate during turning and backing of the tractor 102.

In this respect, upper bearing 246 in combination with lower bearing 226 permit for free rotation of the outer spindle housing 230 about the central spindle 228. A typically suitable bearing for either upper bearing 246 or lower bearing 226 is a tapered bearing available from Berry Bearing of Elgin, Ill. On top of the central spindle 228 and surrounding the spindle bolt 238 are a support washer 244 adjacent the top central spindle 228 and a lock nut 242 to hold the support washer 244 in place and provide for rotation and a cotter key 240 to reinforce the location of the lock nut 242.

Figure 9:
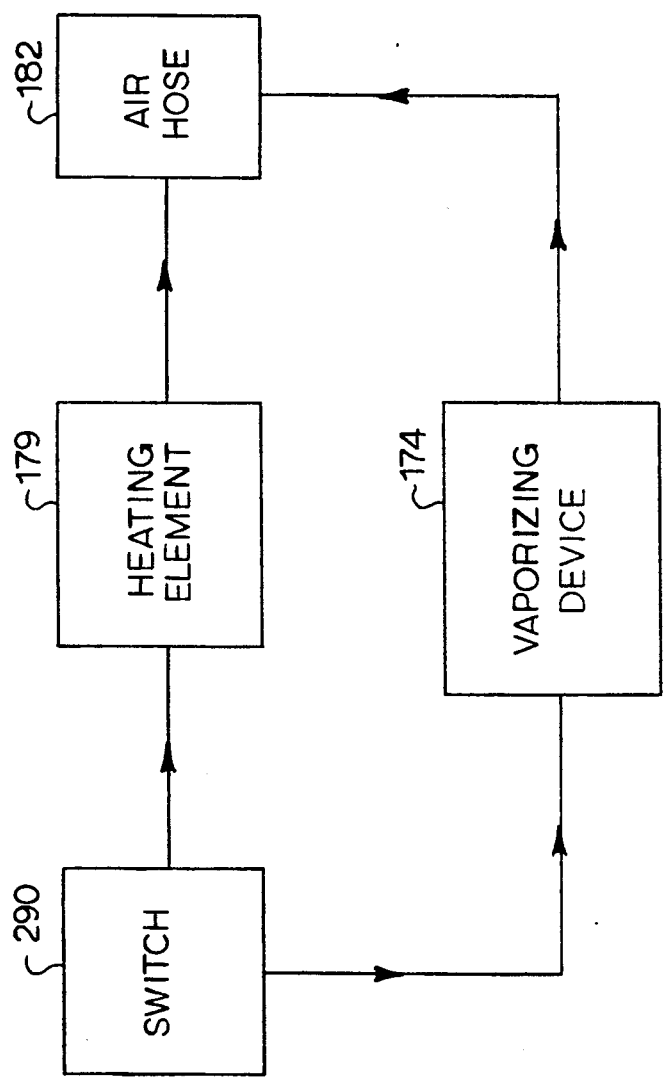
FIG. 9 depicts a block diagram of the elements of box assembly 100 and operating mechanism thereof.

A block diagram of box assembly 100 is shown in FIG. 9. A standard toggle switch assembly 290 or other suitable switch for turning power off and on can be mounted in the cab of tractor 102 and electrically connected in a standard fashion to box assembly 100. In this manner power can selectively be applied to heating element 179 and vaporizing device 174 as desired. Thus box assembly 100 can be turned on cold weather and off in hot weather.

This application—taken as a whole with the specification, claims, drawings and abstract,—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of the disclosure herein and solely because of the disclosure herein, certain modifications of the invention disclosed herein can become clear to a person having ordinary skill in this art. Such modifications are clearly covered hereby.

What is claimed is and sought to be secured by Letters Patent of the United States, is:

1. A box assembly and means for mounting said box assembly on a semi-trailer truck, said box assembly serving to protect at least one air hose and at least one electric cord on said semi-trailer truck, said semi-trailer truck including a tractor and a trailer, said means for mounting secures said box assembly to said tractor, and means for removably connecting said box assembly to said trailer, said box assembly including a container, at least one reel storage means, a heating means, and an anti-freeze injecting means, wherein:

a. said at least one reel storage means, said heating means for heating contents of said container, and said anti-freeze injecting means are operably mounted within said container;

b. said container includes therein means for operably mounting said at least one reel storage means within said container;

c. said container further includes therein means for operably mounting said heating means within said container;

d. said container further includes therein means for operably mounting said anti-freeze injecting means within said container;

e. said heating means is operably connected to an electrical system of said tractor; and f. said anti-freeze injecting means is operably connected to an air compression means of said tractor.

2. The box assembly of claim 1 wherein:

a. said anti-freeze injecting means includes a liquid storage means and a spraying means operably connected to said liquid storage means;

b. said spraying means is additionally operably connected to said at least one air hose to inject anti-freeze from said liquid storage means into said at least one air hose and minimize freezing thereof;

c. said at least one reel storage means includes a first reel, a second reel and a third reel;

d. said first reel receives a first air hose in a stored position;

e. said second reel receives an electrical cord in a stored position;

f. said third reel receives a second air hose in a stored position;

g. said first reel dispenses said first air hose in a use position;

h. said second reel dispenses said electrical cord in a use position; and i. said third reel dispenses said second air hose in a use position.

3. The box assembly of claim 2 wherein:

a. said means for mounting said box assembly on said tractor includes a pivotal means to permit said box assembly to at least partially rotate about a vertical axis;

b. said means for mounting said box assembly further includes a frame secured to said tractor;

c. said frame is secured to said tractor between a fifth wheel and a cab of said tractor; and d. said pivotal means is mounted on said frame.

4. The box assembly of claim 3 wherein:

a. said frame includes a first side bar, a second side bar, a top bar, a first angle bar, and second angle bar;

b. said first side bar and said first angle bar cooperate with a first frame side rail to form a first triangle;

c. said second side bar and said second angle bar cooperate with a second frame side rail to form a second triangle; and d. said top bar connects said first triangle to said second triangle.

5. The box assembly of claim 4 wherein:

a. a support plate is secured to said top bar;

b. a box arm assembly secures said support plate to said top bar;

c. said support plate receives a pivotal mounting assembly; and d. said container is secured to said pivotal mounting assembly.

6. The box assembly of claim 5 wherein:

a. said container includes said first reel, said second reel and said third reel mounted therein adjacent to a first wall thereof;

b. said heating means, and said anti-freeze injecting means are mounted within said container adjacent to a second wall thereof; and c. said first wall is oppositely disposed from said second wall.

7. The box assembly of claim 6 wherein:

a. said pivotal mounting assembly includes a bottom plate and a spindle assembly operably connected to said bottom plate;

b. said bottom plate has at least one mounting aperture to receive said spindle assembly;

c. said at least one mounting aperture aligns with at least one support plate aperture to secure said bottom plate to said support plate;

d. a lower lubricated bearing within said spindle assembly is secured adjacent to said bottom plate and oppositely disposed from said support plate; and e. said spindle assembly includes a central spindle mounted within an outer spindle housing.

8. The box assembly of claim 7 wherein:

a. said pivotal mounting assembly further includes four sections of radially disposed support web;

said four sections of radially disposed support web are secured to said outer spindle housing and support said top plate of said mounting assembly; and c. said top plate includes a plurality of mounting bolts for receipt of a mounting base of said container to securely fasten said container to said frame of said tractor.

9. The box assembly of claim 8 wherein:

a. a spindle bolt is centrally and axially mounted in said central spindle;

b. said central spindle is rotatably secured onto said spindle bolt by a cotter key and a lock nut;

c. a support washer is secured between said central spindle and saiid lock nut to allow for a rotational movement of said central spindle and said outer spindle housing; and d. an upper bearing is situated between said locknut and said cotter key further supporting said central spindle, to permit said case to rotate during turning and backing of said tractor.

10. The box assembly of claim 9 wherein:

a. said first reel is positioned in said container to contain said first air hose;

b. said second reel is positioned in said container to contain said electric cord;

c. said third reel is positioned in said container to contain said second air hose; and d. said first reel, said second reel and said third reel are spring loaded.

11. The box assembly of claim 10 wherein:

a. a front wall of said container includes a hose aperture for each reel; and b. a cleaning means for cleaning each hose is positioned adjacent said hose aperture.

12. The box assembly of claim 11 wherein said cleaning means is at least one brush secured around said hose aperture.

13. The box assembly of claim 12 wherein a viewing means in said container permits checking of a fluid level for said anti-freeze injecting means.

14. The box assembly of claim 13 wherein a vaporizing means cooperates with said anti-freeze injecting means and is connected to an air hose.

15. A box assembly and means for mounting said box assembly, said box assembly serving to protect at least one air hose and at least one electric cord on a semi-trailer truck, said semi-trailer truck including a tractor and a trailer, said means for mounting secures said box assembly to said tractor, and means for removably connecting said box assembly to said trailer, said box assembly including a container, at least one reel storage means, a heating means, and an anti-freeze injecting means, wherein:
   a. said at least one reel storage means, said heating means for heating contents of said container, and said anti-freeze injecting means are operably mounted within said container;
   b. said container includes therein means for operably mounting said at least one reel storage means within said container;
   c. said container further includes therein means for operably mounting said heating means within said container;
   d. said container further includes therein means for operably mounting said anti-freeze injecting means within said container;
   e. said heating means is operably connected to an electrical system of said tractor;
   f. said anti-freeze injecting means is operably connected to an air compression means of said tractor;
   g. said anti-freeze injecting means includes a liquid storage means and a spray means operably connected to said liquid storage means;
   h. said spraying means is additionally operably connected to said at least one air hose to inject anti-freeze from said liquid storage means into said at least one air hose and minimize freezing thereof;
   i. said means for mounting said box assembly on said tractor includes a pivotal means to permit said box assembly to at least partially rotate about a vertical axis;
   j. said means for mounting said box assembly further includes a frame secured to said tractor;
   k. said frame is secured to said tractor between a fifth wheel and a cab of said tractor; and
   l. said pivotal means is mounted on said frame.

16. The box assembly of claim 15 wherein:
   a. said at least one reel storage means includes a first reel, a second reel and a third reel;
   b. said first reel receives a first air hose in a stored position;
   c. said second reel receives an electrical cord in a stored position;
   d. said third reel receives a second air hose in a stored position;
   e. said first reel dispenses said first air hose in a use position;
   f. said second reel dispenses said electrical cord in a use position; and
   g. said third reel dispenses said second air hose in a use position.

17. The box assembly of claim 16 wherein:
   a. said frame includes a first side bar, a second side bar, a top bar, a first angle bar, and second angle bar;
   b. said first side bar and said first angle bar cooperate with a first frame side rail to form a first triangle,
   c. said second side bar and said second angle bar cooperate with a second frame side rail to form a second triangle;
   d. said top bar connects said first triangle to said second triangle;
   e. a support plate is secured to said top bar;
   f. a box arm assembly secures said support plate to said top bar;
   g. said support plate receives a pivotal mounting assembly;
   h. said container is secured to said pivotal mounting assembly;
   i. said container includes said first reel, said second reel and said third reel mounted therein adjacent to a first wall thereof;
   j. said heating means, and said anti-freeze injecting means are mounted within said container adjacent to a second wall thereof;
   k. said first wall is oppositely disposed from said second wall;
   l. said pivotal mounting assembly includes a bottom plate and a spindle assembly operably connected to said bottom plate;
   m. said bottom plate has at least one mounting aperture to receive said spindle assembly;
   n. said at least one mounting aperture aligns with at least one support plate aperture to secure said bottom plate to said support plate;
   o. a lower lubricated bearing within said spindle assembly is secured adjacent to said bottom plate and oppositely disposed from said support plate; and
   p. said spindle assembly includes a central spindle mounted within an outer spindle housing.

18. The box assembly of claim 17 wherein:
   a. said pivotal mounting assembly further includes four sections of radially disposed support web;
   b. said four sections of radially disposed support web are secured to said outer spindle housing and support said top plate of said mounting assembly;
   c. said top plate includes a plurality of mounting bolts for receipt of a mounting base of said container to securely fasten said container to said frame of said tractor;
   d. a spindle bolt is centrally and axially mounted in said central spindle;
   e. said central spindle is rotatably secured onto said spindle bolt by a cotter key and a lock nut;
   f. a support washer is secured between said central spindle and saiid lock nut to allow for a rotational movement of said central spindle and said outer spindle housing; and
   g. an upper bearing is situated between said locknut and said cotter key further supporting said central spindle, to permit said case to rotate during turning and backing of said tractor.

19. The box assembly of claim 18 wherein:
   a. a front wall of said container includes a hose aperture for each reel; and
   b. a cleaning means for cleaning each hose is positioned adjacent said hose aperture;
   c. said cleaning means includes at least one brush secured around said hose aperture;
   d. a viewing means in said container permits checking of a fluid level for said anti-freeze injecting means; and
   e. a vaporizing means cooperates with said anti-freeze injecting means and is connected to an air hose.

* * * * *